United States Patent [19]
Yen et al.

[11] 4,008,617
[45] Feb. 22, 1977

[54] ELECTRONIC THERMOMETER AND METHOD

[75] Inventors: David H. Yen, Sunnyvale; Tim R. Connely, Campbell; John J. Lee, Cupertino, all of Calif.

[73] Assignee: Filac Corporation, Sunnyvale, Calif.

[22] Filed: Dec. 8, 1975

[21] Appl. No.: 638,430

Related U.S. Application Data

[63] Continuation-in-part of Ser. No. 539,927, Jan. 9, 1975, abandoned.

[52] U.S. Cl. .............................................. 73/362 R
[51] Int. Cl.$^2$ ......................................... G01K 3/00
[58] Field of Search ................... 73/362 AR, 362 R

[56] References Cited
UNITED STATES PATENTS

| | | | |
|---|---|---|---|
| 2,755,999 | 7/1956 | Vickers | 73/359 X |
| 3,477,292 | 11/1969 | Thornton | 73/362 AR |
| 3,702,076 | 11/1972 | Georgi | 73/362 AR |
| 3,817,105 | 6/1974 | Luhowy | 73/362 AR |
| 3,822,598 | 7/1974 | Brothers et al. | 73/362 AR |
| 3,834,238 | 9/1974 | Mueller et al. | 73/362 AR |
| 3,872,726 | 3/1975 | Kauffeld et al. | 73/362 AR |
| 3,872,728 | 3/1975 | Joyce et al. | 73/362 AR |
| 3,877,307 | 4/1976 | Georgi | 73/362 AR |
| 3,878,724 | 4/1975 | Allen | 73/362 AR |

Primary Examiner—Jerry W. Myracle
Attorney, Agent, or Firm—Flehr, Hohbach, Test, Albritton & Herbert

[57] ABSTRACT

Electronic thermometer and method for determining temperature in which compensation is provided for the localized cooling of a body caused by bringing a sensing element of lower temperature into contact with the body. The output of the sensing element is combined with a signal representative of the initial temperature of the element to compensate for the localized cooling and provide an advance indication of the equilibrium temperature of the body.

9 Claims, 2 Drawing Figures

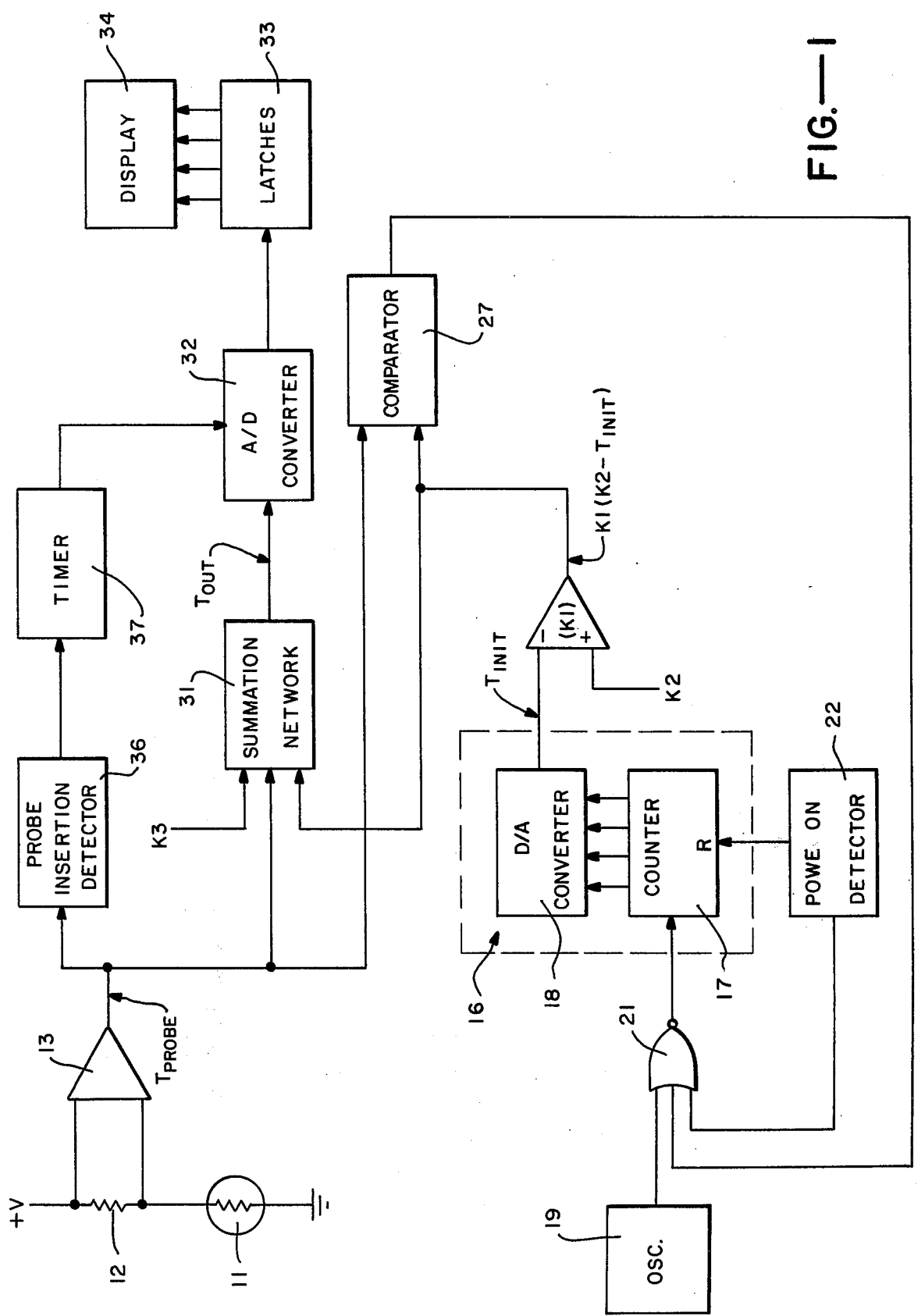
FIG.—1

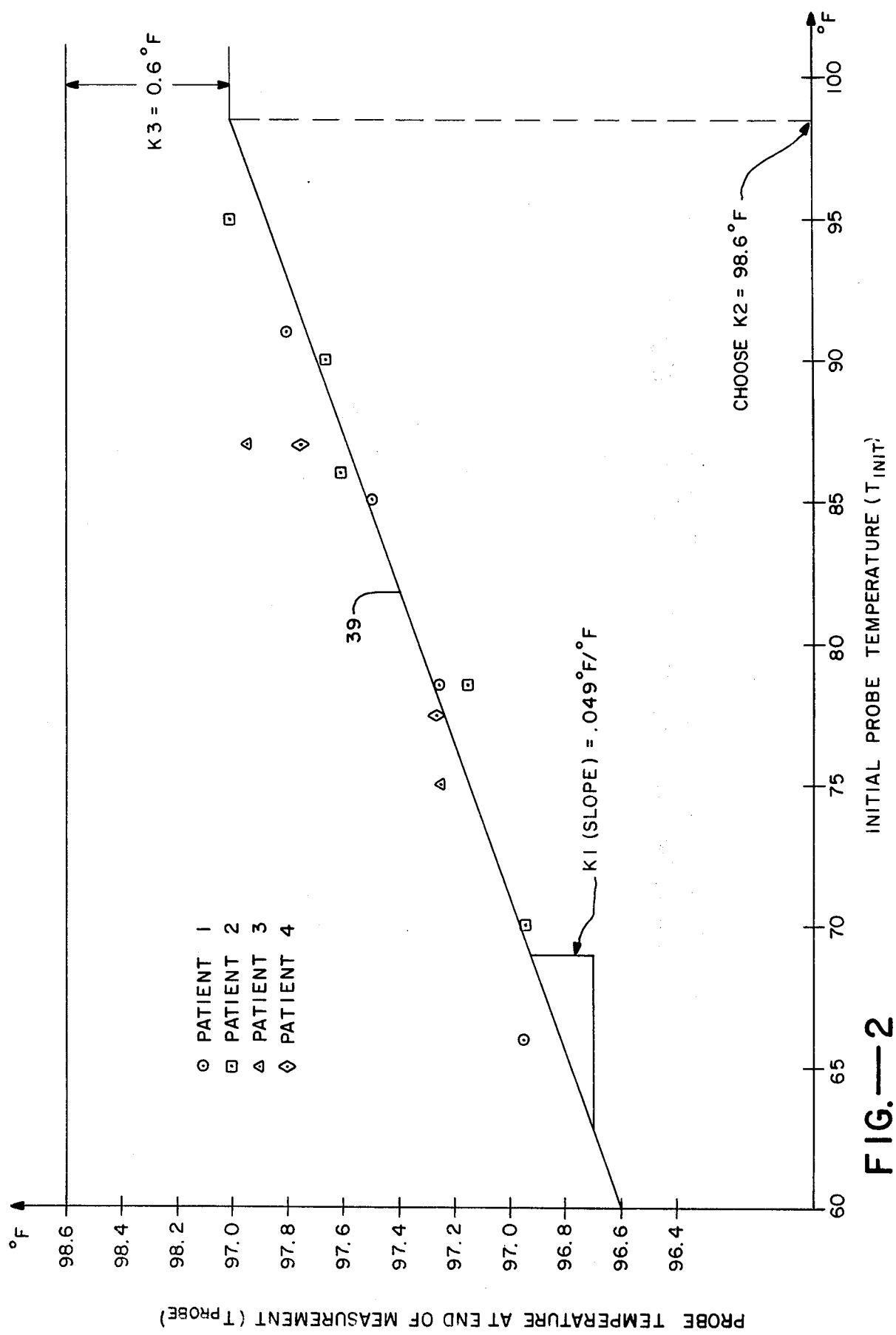
FIG.—2

ELECTRONIC THERMOMETER AND METHOD

CROSS-REFERENCE TO RELATED APPLICATION

This application is a continuation-in-part of co-pending application Ser. No. 539,927, filed Jan. 9, 1975 now abandoned.

BACKGROUND OF THE INVENTION

This invention pertains generally to temperature measurement and more particularly to an electronic thermometer and method for providing an advance indication of the final state of a temperature to be measured.

Although there have been attempts to provide electronic thermometers utilizing anticipation circuitry to provide an advance indication of the final state of a measured temperature, the electronic thermometers heretofore provided for this purpose have had a number of limitations. In some instances, for example, the readings obtained with such thermometers have not been accurate, and the readings can be disturbed by repositioning of the sensing element. In addition, such thermometers tend to require excessively long periods for determining temperature.

SUMMARY AND OBJECTS OF THE INVENTION

It has been observed that the inaccuracy of electronic thermometers is largely the result of localized cooling of body tissue contacted by the sensing element of the thermometer, and this cooling prevents the sensing element from accurately indicating the temperature of the body until the temperature of the contacted tissue again reaches equilibrium with the remainder of the body. In the thermometer and method of the invention, the output of the sensing element is combined with a signal representative of the initial temperature of the element to compensate for the localized cooling and provide an advance indication of the equilibrium temperature. Utilizing this technique, an accurate measurement of the human body temperature can be made in less than one-half minute even though the equilibrium temperature is not reached for more than 1½ minutes after the sensing element contacts the body tissue.

It is in general an object of the invention to provide a new and improved electronic thermometer and method for determining temperature.

Another object of the invention is to provide a thermometer and method of the above character for providing an advance indication of the final state of a temperature in a relatively short time.

Additional objects and features of the invention will be apparent from the following description in which the preferred embodiments are set forth in detail in conjunction with the accompanying drawings.

BRIEF DESCRIPTION OF THE DRAWINGS

FIG. 1 is a block diagram of one embodiment of an electronic thermometer according to the invention.

FIG. 2 is a graphical representation showing the empirical determination of correction factors utilized in the embodiment of FIG. 1.

DESCRIPTION OF THE PREFERRED EMBODIMENTS

As illustrated in FIG. 1, the electronic thermometer includes a temperature sensing probe adapted to be placed in thermal contact with the body tissue where temperature is to be measured, such as by placing the probe in the mouth of a patient. The probe comprises a temperature sensing element 11, such as a thermistor, having an electrical characteristic determined by the temperature of the element. One suitable thermistor is a Fenwal model K2600 which is individually calibrated for temperature response. Current is supplied to the thermistor by a suitable source, which is illustrated as a voltage source and a resistor 12 connected in series with the thermistor. The thermistor current is preferably maintained at a sufficiently low level that self heating of the thermistor is less than about 1/20° F and is therefore substantially imperceptible in measuring body temperatures. The probe is enclosed in a suitable covering such as a disposable plastic sheath.

The resistance of thermistor 11 varies inversely with temperature, and the thermistor current produces a voltage drop across resistor 12 which increases with temperature. This voltage drop is applied to the input of an amplifier 13 which produces an output voltage which varies linearly with the temperature of the sensing element.

Means is provided for storing a signal corresponding to the initial temperature of the sensing element prior to contact of the element with the body tissue. This means includes a sample and hold circuit 16 comprising a digital counter 17 and a digital-to-analog converter 18. In the preferred embodiment, counter 17 is a conventional binary counter, and D/A converter 18 comprises an R-2R resistance ladder network connected to the weighted outputs of the counter. Clock pulses are delivered to the counter from an oscillator 19 through a control gate 21. The oscillator is a free running oscillator which operates at a suitable frequency, such as 115 KHz, and in the embodiment illustrated, gate 21 is a NAND gate. The output of the oscillator is connected to one input of the NAND gate, and the output of the gate is connected to the clock input of counter 17. A POWER ON detector 22 is connected to the reset input of counter 17 for resetting the counter to an initial level, e.g. zero, when operating power is applied to the thermometer. The POWER ON detector is also connected to a second input of NAND gate 21 for delivering an enabling signal to the gate when the power is turned on.

The output of digital-to-analog converter 18 is connected to the negative input of an operational amplifier 26, and the output of this amplifier is connected to one input of a voltage comparator 27. The comparator receives a second input from the output of amplifier 13, and the output of the comparator is connected to a third input of NAND gate 21.

Means is provided for processing the temperature signal from amplifier 13 to provide an output signal representative of the equilibrium temperature of the body even though the tissue contacted by the sensing element has not returned to the equalibrium temperature. This means includes a summation network 31 having a first input connected to the output of amplifier 13 and a second input connected to the output of amplifier 26. The output of the summation network is connected to the input of an analog-to-digital converter 32, and the output of the A/D converter is connected to storage latches 33. The latches are connected to digital display elements 34 to provide a digital indication of the temperature being measured.

Means is also provided for defining a measurement period of predetermined duration after the sensing element is placed in contact with the body tissue of the patient. This means includes a probe insertion detector 36 connected to the output of amplifier 13 and a timer 37 connected to the output of the insertion detector. In one preferred embodiment, the insertion detector comprises a voltage level detector which delivers a trigger signal to timer 37 when the voltage at the output of amplifier 13 reaches a predetermined level corresponding to a predetermined temperature, such as 94° F. If desired, however, other types of insertion detectors can be utilized, for example, a slope detector which delivers a trigger signal to the timer when the temperature signal increases at a predetermined rate.

Timer 37 is of conventional design and delivers an output signal a predetermined time after receiving the trigger signal from the insertion detector. A measurement period of 28 seconds has been found to be particularly suitable for measuring human body temperatures, and in the preferred embodiment the timer has a period of 28 seconds. The output of the timer is connected to a control input of A/D converter 32, and the timer signal conditions the converter to transfer the signal then present therein to the latches for display.

In the embodiment illustrated, amplifier 26 and summation network 31 combine the signal from amplifier 13 and the signal stored in sample and hold circuit 16 according to the following relationship:

$$T_{OUT} = T_{PROBE} + K1 (K2 - T_{INIT}) + K3,$$

where $T_{OUT}$ is an advance indication of the equilibrium temperature, as represented by the signal at the output of the summation network $T_{PROBE}$ is the temperature of the sensing element, as represented by the signal at the output of amplifier 13, $T_{INIT}$ is the initial temperature of the sensing element, as represented by the signal stored in sample and hold circuit 16 and K1, K2 and K3 are empirically derived constants.

The derivation of constants K1, K2 and K3 is illustrated in the graphical representation of FIG. 2, wherein the initial probe temperature $T_{INIT}$ is plotted along the abscissa and the temperature of the probe at the end of the measurement period is plotted along the ordiante. Data for four patients or subjects is shown, the data for each patient being normalized for a temperature of 98.6° F. Line 39 is drawn through the normalized data points, and k1 is equal to the slope of this line. From the figure, it can be seen that the temperature at the end of the measurement period increases about 0.049° F for each degree of increase in the initial probe temperature, and consequently K1 has a value on the order of 0.049° F/° F. K2 is an arbitrarily chosen value of the initial probe temperature, and K3 is the difference between the normalized equilibrium temperature of 98.6° F and the final probe temperature corresponding to an initial probe temperature equal to K2. In the embodiment illustrated, K2 is chosen to be 98.6° F, and K3 is 0.6° F. The data of FIG. 2 was obtained with a probe comprising a Fenwal model K2600 thermistor and a solid plastic cover. With different types of thermistors and coverings, constants K1, K2 and K3 will vary.

In the system of FIG. 1, amplifier 26 has a gain equal to K1, and a voltage corresponding to the value of K2 is applied to the positive input of this amplifier, whereby the output of the amplifier is a signal corresponding to K1 ($K2 - T_{INIT}$). In summation network 31, this signal is combined with the output of amplifier 13 and a voltage corresponding to the value of K3 to provide the desired output signal corresponding to $$T_{PROBE} + K1 (K2 - T_{INIT}) + K3.$$

Operation and use of the thermometer and therein the method of the invention can now be described. It is assumed that the power is initially turned off and that the probe is at a lower temperature than the body of the patient. When the power is applied to the thermometer, POWER ON detector 22 resets counter 17 to zero and conditions NAND gate 21 to pass clock pulses from oscillator 19 to the counter. D/A converter 18 delivers an analog signal corresponding to the count in the counter, and this signal is amplified by amplifier 26. When the signal at the output of amplifier 26 reaches the level of the temperature signal at the output of amplifier 13, comparator 27 delivers a signal to NAND gate 31 to inhibit the passage of further pulses to the counter. Thereafter, the count in the counter and the signal at the output of D/A converter 18 remain at levels corresponding to the initial probe temperature $T_{INIT}$.

When the probe is inserted into the mouth of the patient or otherwise brought into contact with the patient's body tissue, the temperature of the tissue contacted by the probe drops perceptibly, e.g. 1° F or more with a probe initially at room temperature. The cooled region returns exponentially to the original body temperature, and it typically requires 90 seconds or more to reach equilibrium.

The signal stored in the sample and hold circuit is processed by amplifier 26 in the manner described above, and the signals from amplifiers 13 and 26 are combined in summation network 31 to provide a signal corresponding to $T_{PROBE} + K1 (K2 - T_{INIT}) + K3$. This signal is converted to digital form in A/D converter 32.

The increase in probe temperature produced by contact of the sensing element with the body tissue is detected by probe insertion detector 36, which actuates timer 37 to initiate the measurement period. At the conclusion of the measurement period, e.g. 28 seconds, the timer causes the A/D converter to tranfer the signal then present therein to latches 33 for display to indicate the temperature of the body.

The invention has a number of important features and advantages. It provides compensation for localized cooling of the body tissue contacted by the temperature probe and provides an accurate advance indication of the equilibrium temperature. In the embodiment described, for example, the equilibrium temperature is determined in only 28 seconds even though that temperature is not reached for more than 90 seconds.

It is apparent from the foregoing that a new and improved electronic thermometer and method for determining temperature have been provided. While only the presently preferred embodiments have been described, as will be apparent to those familiar with the art, certain changes and modifications can be made without departing from the scope of the invention as defined by the following claims.

What is claimed is:

1. In a method of determining the temperature of a body utilizing a sensing element having an initial temperature different than the temperature of the body, the steps of: bringing the sensing element into contact with a predetermined region of the body, the temperature of said region being changed by the contact with the sensing element, maintaining the sensing element in contact with the body to permit the temperature of the sensing element and the temperature of the predetermined region to approach equilibrium with the temperature of the remainder of the body, providing an electrical signal corresponding to the temperature of the sensing element, storing a signal corresponding to the initial temperature of the sensing element, and combining the stored signal with the temperature signal a predetermined time after the sensing element is brought into contact with the body to provide an advance indication of the equilibrium temperature.

2. The method of claim 1 wherein the temperature signal is combined with the stored signal according to the following relationship:

$$T_{OUT} = T_{PROBE} + K1 (K2 - T_{INIT}) + K3,$$

where $T_{OUT}$ is the advance indication of the equilibrium temperature, $T_{PROBE}$ is the temperature of the sensing element at the end of a predetermined measurement period, $T_{INIT}$ is the initial temperature of the sensing element, $K1$ is the change in $T_{PROBE}$ per unit change in $T_{INIT}$, $K2$ is a predetermined value of $T_{INIT}$, and $K3$ is the difference between the equilibrium temperature and $T_{PROBE}$ when $T_{INIT} = K2$.

3. In an electronic thermometer for determining the temperature of a body: a sensing element contactable with the body and having an initial temperature lower than the temperature of the body, means connected to the sensing element for providing an electrical signal corresponding to the temperature of the element, means for storing an electrical signal corresponding to the initial temperature of the sensing element, and means responsive to the stored signal and the temperature signal a predetermined time after the sensing element is contacted with body for providing an advance indication of the equilibrium temperature of the sensing element and body.

4. The thermometer of claim 3 wherein the means responsive to the stored signal and the temperature signal includes means for combining said signals according to the following relationship:

$$T_{OUT} = T_{PROBE} + K1 (K2 - T_{INIT}) + K3,$$

where $T_{OUT}$ is the advance indication of the equilibrium temperature, $T_{PROBE}$ is the temperature of the sensing element at the predetermined time, $T_{INIT}$ is the initial temperature of the sensing element, $K1$ is the change in $T_{PROBE}$ per unit change in $T_{INIT}$, $K2$ is a predetermined value of $T_{INIT}$, and $K3$ is the difference between the equilibrium temperature and $T_{PROBE}$ when $T_{INIT} = K2$.

5. In an electronic thermometer: a sensing element adapted to be brought into contact with a body for determining the temperature of the body, means connected to the sensing element for providing an electrical signal corresponding to the temperature of said element, means for storing a signal corresponding to the temperature of the sensing element prior to contact with the body, means responsive to the electrical signal for detecting contact between the sensing element and the body, summation means for combining the electrical signal and the stored signal in a predetermined manner to provide an output signal indicative of the temperature of the body, and means for delivering the output signal to a temperature indicator a predetermined time after contact between the sensing element and body is detected, said predetermined time being shorter than the time required for the temperature of the sensing element and body to reach equilibrium.

6. The thermometer of claim 5 wherein the means for storing a signal comprises a digital counter and means for advancing the counter to a level corresponding to the temperature of the sensing element prior to contact with the body.

7. The thermometer of claim 5 wherein the means for detecting contact comprises a level detector responsive to a predetermined level of the electrical signal.

8. The thermometer of claim 5 wherein the means for detecting contact comprises a slope detector responsive to a predetermined rate of change in the electrical signal.

9. The thermometer of claim 5 wherein the electrical signal and the stored signal are combined according to the following relationship:

$$T_{OUT} = T_{PROBE} + K1 (K2 - T_{INIT}) + K3,$$

where $T_{OUT}$ is the output signal, $T_{PROBE}$ is the advance indication of the equilibrium temperature, $T_{PROBE}$ is the temperature of the sensing element at the predetermined time, $T_{INIT}$ is the initial temperature of the sensing element, $K1$ is the change in $T_{PROBE}$ per unit change in $T_{INIT}$, $K2$ is a predetermined value of $T_{INIT}$, and $K3$ is the difference between the equilibrium temperature and $T_{PROBE}$ when $T_{INIT} = K2$.

* * * * *